(12) United States Patent
Duponchel et al.

(10) Patent No.: US 9,760,945 B2
(45) Date of Patent: *Sep. 12, 2017

(54) VISUALLY GENERATED CONSUMER PRODUCT PRESENTATION

(71) Applicant: INTERNATIONAL BUSINESS MACHINES CORPORATION, Armonk, NY (US)

(72) Inventors: Bernadette R. Duponchel, Lincoln, RI (US); Myron Flickner, San Jose, CA (US); Victoria B. Platt, Charlotte, NC (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/266,716

(22) Filed: Sep. 15, 2016

(65) Prior Publication Data

US 2017/0004569 A1 Jan. 5, 2017

Related U.S. Application Data

(63) Continuation of application No. 13/926,544, filed on Jun. 25, 2013, now Pat. No. 9,477,973.

(51) Int. Cl.
*G06F 3/00* (2006.01)
*G06F 3/048* (2013.01)
(Continued)

(52) U.S. Cl.
CPC ..... *G06Q 30/0643* (2013.01); *G06Q 30/0255* (2013.01); *G06Q 30/0269* (2013.01);
(Continued)

(58) Field of Classification Search
None
See application file for complete search history.

(56) References Cited

U.S. PATENT DOCUMENTS 5,754,938 A 5/1998 Herz et al.
5,758,257 A 5/1998 Herz et al.
(Continued)

FOREIGN PATENT DOCUMENTS

WO 9423383 10/1994

OTHER PUBLICATIONS

Office Action (Mail Date Jun. 26, 2015) for U.S. Appl. No. 13/926,544, filed Jun. 25, 2013; Confirmation No. 8388.
(Continued)

*Primary Examiner* — Yongjia Pan
(74) *Attorney, Agent, or Firm* — Schmeiser, Olsen & Watts; John R. Pivnichny

(57) ABSTRACT

A personalization enhancement method and system. The method includes retrieving and analyzing digital content associated with a user. Characteristics describing the digital content are tagged and transferred to a profile of said the user. The profile includes additional characteristics generated during previous analysis of data from the digital content and additional digital content associated with the user. User information associated with products, a location, and a time profile is assigned. The profile is analyzed based on selection and interaction of the user with respect to a consumer Website. The profile includes the characteristics and the additional characteristics with respect to products and services of the consumer Website. A presentation color setting and a group of products and services of are determined for presentation to the user. The group of products and services are presented to the user using the presentation color setting.

20 Claims, 5 Drawing Sheets

(51) Int. Cl.
*G06Q 30/06* (2012.01)
*G06Q 30/02* (2012.01)
*H04L 29/08* (2006.01)
*G06Q 50/00* (2012.01)
*G06T 11/00* (2006.01)

(52) U.S. Cl.
CPC ..... *G06Q 30/0277* (2013.01); *G06Q 30/0282* (2013.01); *H04L 67/306* (2013.01); *G06Q 50/01* (2013.01); *G06T 11/001* (2013.01)

(56) References Cited

U.S. PATENT DOCUMENTS

| | | | |
|---|---|---|---|
| 7,548,874 | B2 | 6/2009 | Kanevsky et al. |
| 7,853,881 | B1 | 12/2010 | Aly Assal et al. |
| 7,953,631 | B1 | 5/2011 | Moss et al. |
| 8,429,160 | B2 | 4/2013 | Osann, Jr. |
| 8,515,828 | B1 | 8/2013 | Wolf et al. |
| 8,788,372 | B2 | 7/2014 | Kettner et al. |
| 8,862,691 | B2 | 10/2014 | Aroner |
| 9,037,531 | B2 | 5/2015 | Pinckney et al. |
| 9,069,845 | B2 | 6/2015 | Oliver et al. |
| 9,137,275 | B2 | 9/2015 | Rose |
| 2007/0192345 | A1 | 8/2007 | Finley et al. |
| 2007/0244758 | A1 | 10/2007 | Xie |
| 2007/0299828 | A1 | 12/2007 | Lewis et al. |
| 2008/0004951 | A1 | 1/2008 | Huang et al. |
| 2008/0162478 | A1 | 7/2008 | Pugh et al. |
| 2009/0234716 | A1 | 9/2009 | Mallick et al. |
| 2010/0030620 | A1 | 2/2010 | Wannier et al. |
| 2010/0082429 | A1 | 4/2010 | Samdadiya et al. |
| 2010/0241968 | A1 | 9/2010 | Tarara et al. |
| 2010/0312650 | A1 | 12/2010 | Pinckney et al. |
| 2011/0066497 | A1 | 3/2011 | Gopinath et al. |
| 2011/0225197 | A1 | 9/2011 | Howes et al. |
| 2012/0109711 | A1 | 5/2012 | Boe et al. |
| 2012/0240080 | A1 | 9/2012 | O'Malley |
| 2013/0085858 | A1 | 4/2013 | Sim et al. |
| 2013/0144802 | A1 | 6/2013 | Bank et al. |
| 2013/0166725 | A1 | 6/2013 | Liyanage et al. |
| 2013/0280682 | A1 | 10/2013 | Levine et al. |
| 2014/0122165 | A1 | 5/2014 | Fort |
| 2014/0143720 | A1 | 5/2014 | Dimarco et al. |
| 2014/0214483 | A1 | 7/2014 | Minnis et al. |
| 2014/0379484 | A1 | 12/2014 | Duponchel et al. |
| 2015/0095288 | A1 | 4/2015 | Amarendran |
| 2015/0161686 | A1 | 6/2015 | Williams et al. |

OTHER PUBLICATIONS

Amendment filed Sep. 28, 2015 in response to Office Action (Mail Date Jun. 26, 2015) for U.S. Appl. No. 13/926,544, filed Jun. 25, 2013; Confirmation No. 8388.
Final Office Action (Mail Date Jan. 11, 2016) for U.S. Appl. No. 13/926,544, filed Jun. 25, 2013; Confirmation No. 8388.
Amendment filed Mar. 11, 2016 in response to Final Office Action (Mail Date Jan. 11, 2016) for U.S. Appl. No. 13/926,544, filed Jun. 25, 2013; Confirmation No. 3388.
Notice of Allowance (Mail Date Jul. 6, 2016) for U.S. Appl. No. 13/926,544, filed Jun. 25, 2013; Confirmation No. 8388.

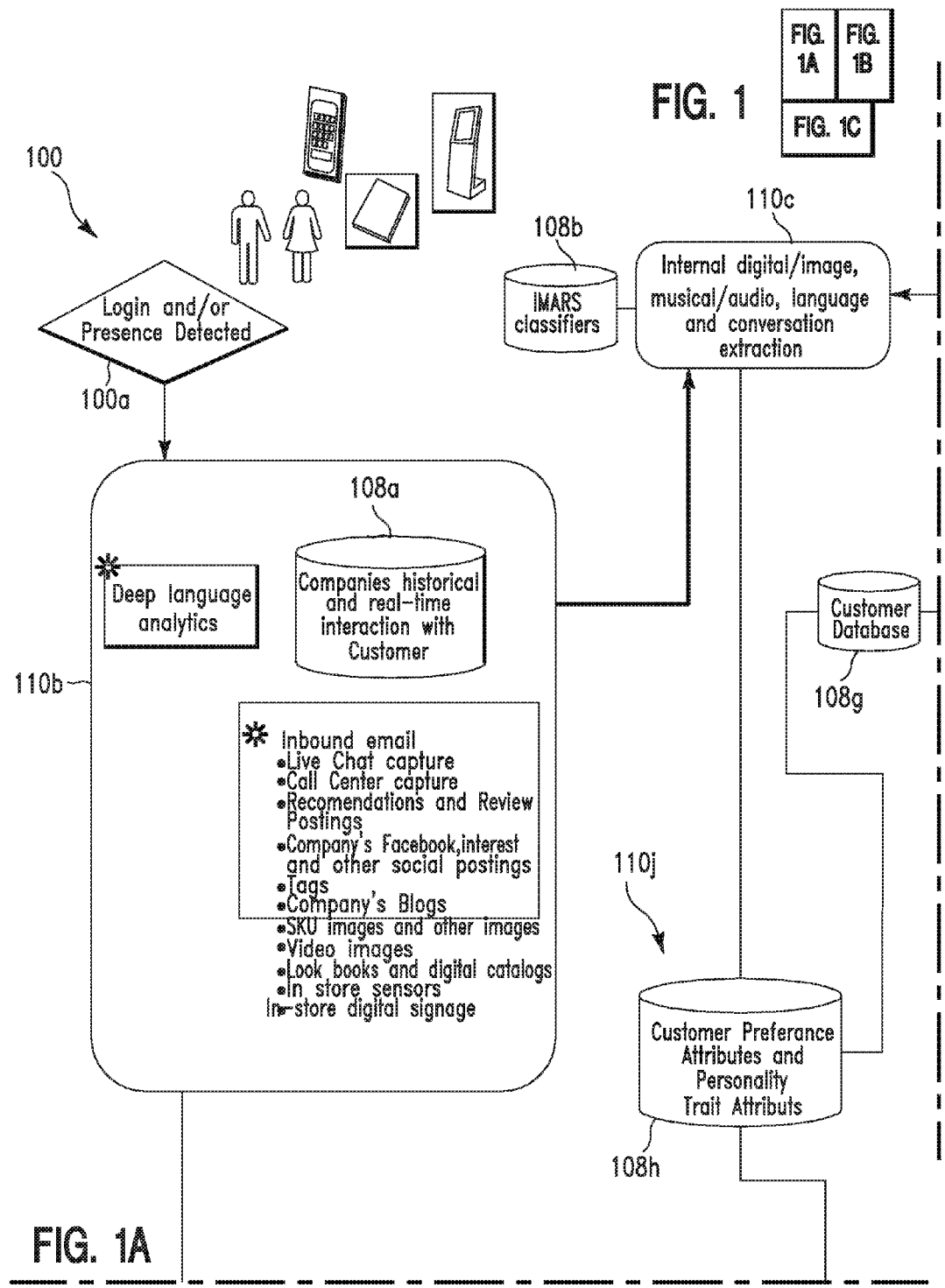

VISUALLY GENERATED CONSUMER PRODUCT PRESENTATION

This application is a continuation application claiming priority to Ser. No. 13/926,544 filed Jun. 25, 2013, now U.S. Pat. No. 9,477,973 issued Oct. 25, 2016.

FIELD

One or more embodiments of the invention relate generally to a method for analyzing digital content of a user, and in particular to a method and associated system for determining presentation settings for presenting products and services to the user.

BACKGROUND

Analyzing items for presentation to a user typically includes an inaccurate process with little flexibility. Accordingly, there exists a need in the art to overcome at least some of the deficiencies and limitations described herein above.

SUMMARY

A first embodiment of the invention provides a method comprising: retrieving, by a computer processor of a computing system, digital content associated with a user; first analyzing, by the computer processor, the digital content; tagging, by the computer processor based on results of the first analyzing, characteristics describing the digital content; transferring, by the computer processor, the characteristics to a profile of the user, the profile comprising additional characteristics generated during previous analysis of data from the digital content and additional digital content associated with the user; assigning, by the computer processor based on the previous analysis, user information associated with products, a location, and a time profile; determining, by the computer processor, that the user is currently visiting a consumer Website; second analyzing, by the computer processor based on selection and interaction of the user with respect to the consumer Website, the profile comprising the characteristics and the additional characteristics with respect to products and services of the consumer Website; determining, by the computer processor based on results of the second analyzing, a presentation color setting and a group of products and services of the products and services for presentation to the user; and presenting, by the computer processor to the user using the presentation color setting, the group of products and services.

A second embodiment of the invention provides a computer program product, comprising a computer readable hardware storage device storing a computer readable program code, the computer readable program code comprising an algorithm that when executed by a computer processor of a computer system implements a method, the method comprising: retrieving, by the computer processor, digital content associated with a user; first analyzing, by the computer processor, the digital content; tagging, by the computer processor based on results of the first analyzing, characteristics describing the digital content; transferring, by the computer processor, the characteristics to a profile of the user, the profile comprising additional characteristics generated during previous analysis of data from the digital content and additional digital content associated with the user; assigning, by the computer processor based on the previous analysis, user information associated with products, a location, and a time profile; determining, by the computer processor, that the user is currently visiting a consumer Website; second analyzing, by the computer processor based on selection and interaction of the user with respect to the consumer Website, the profile comprising the characteristics and the additional characteristics with respect to products and services of the consumer Website; determining, by the computer processor based on results of the second analyzing, a presentation color setting and a group of products and services of the products and services for presentation to the user; and presenting, by the computer processor to the user using the presentation color setting, the group of products and services.

A third embodiment of the invention provides a computer system comprising a computer processor coupled to a computer-readable memory unit, the memory unit comprising instructions that when executed by the computer processor implements a method comprising: retrieving, by the computer processor, digital content associated with a user; first analyzing, by the computer processor, the digital content; tagging, by the computer processor based on results of the first analyzing, characteristics describing the digital content; transferring, by the computer processor, the characteristics to a profile of the user, the profile comprising additional characteristics generated during previous analysis of data from the digital content and additional digital content associated with the user; assigning, by the computer processor based on the previous analysis, user information associated with products, a location, and a time profile; determining, by the computer processor, that the user is currently visiting a consumer Website; second analyzing, by the computer processor based on selection and interaction of the user with respect to the consumer Website, the profile comprising the characteristics and the additional characteristics with respect to products and services of the consumer Website; determining, by the computer processor based on results of the second analyzing, a presentation color setting and a group of products and services of the products and services for presentation to the user; and presenting, by the computer processor to the user using the presentation color setting, the group of products and services.

The present invention advantageously provides a simple method and associated system capable of analyzing items for presentation to a user.

BRIEF DESCRIPTION OF THE DRAWINGS

FIG. 1, including FIGS. 1A-1C, illustrates a system for determining a consumer buying sentiment, in accordance with embodiments of the present invention.

DETAILED DESCRIPTION

Figure 1B:
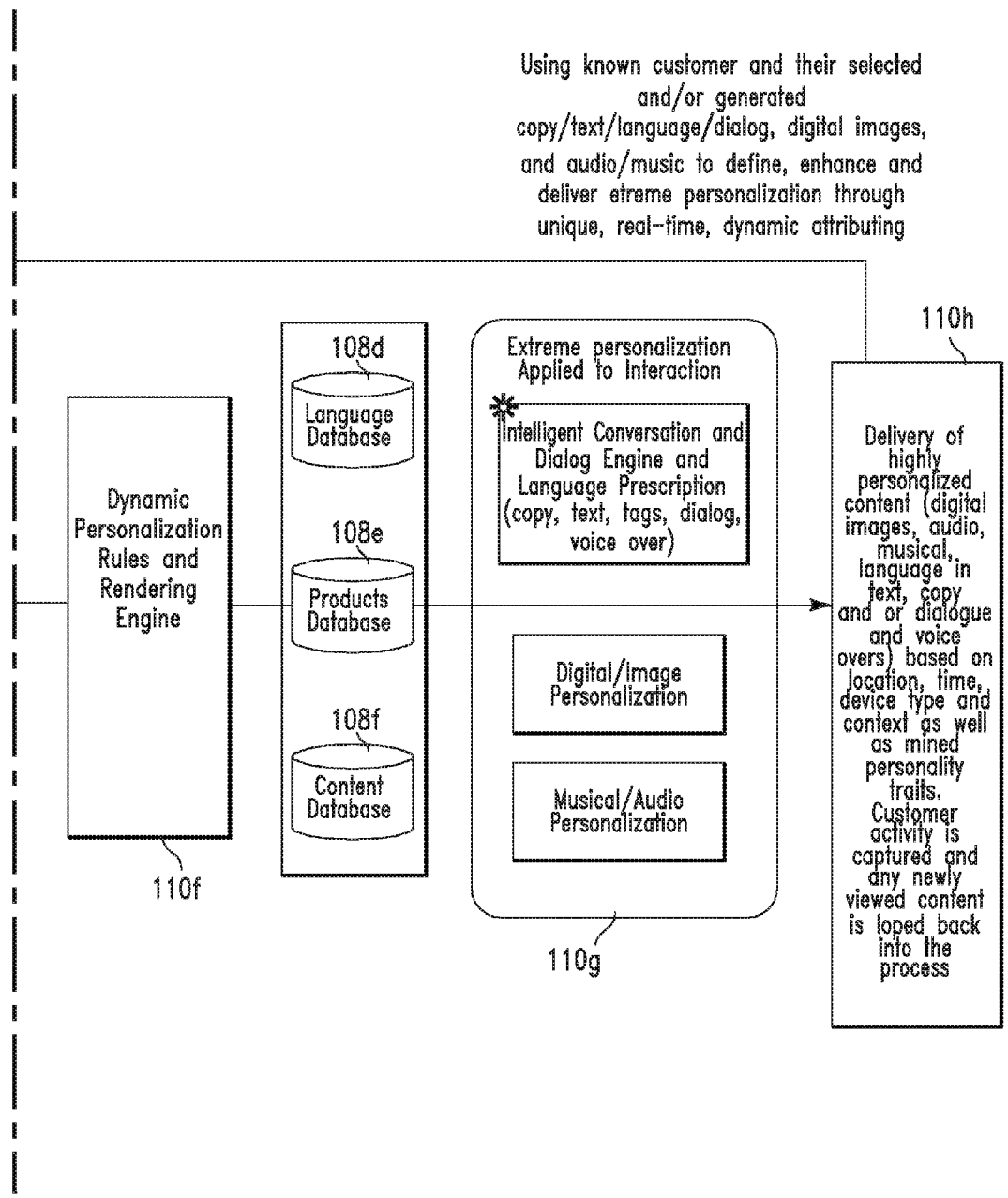
Figure 1C:
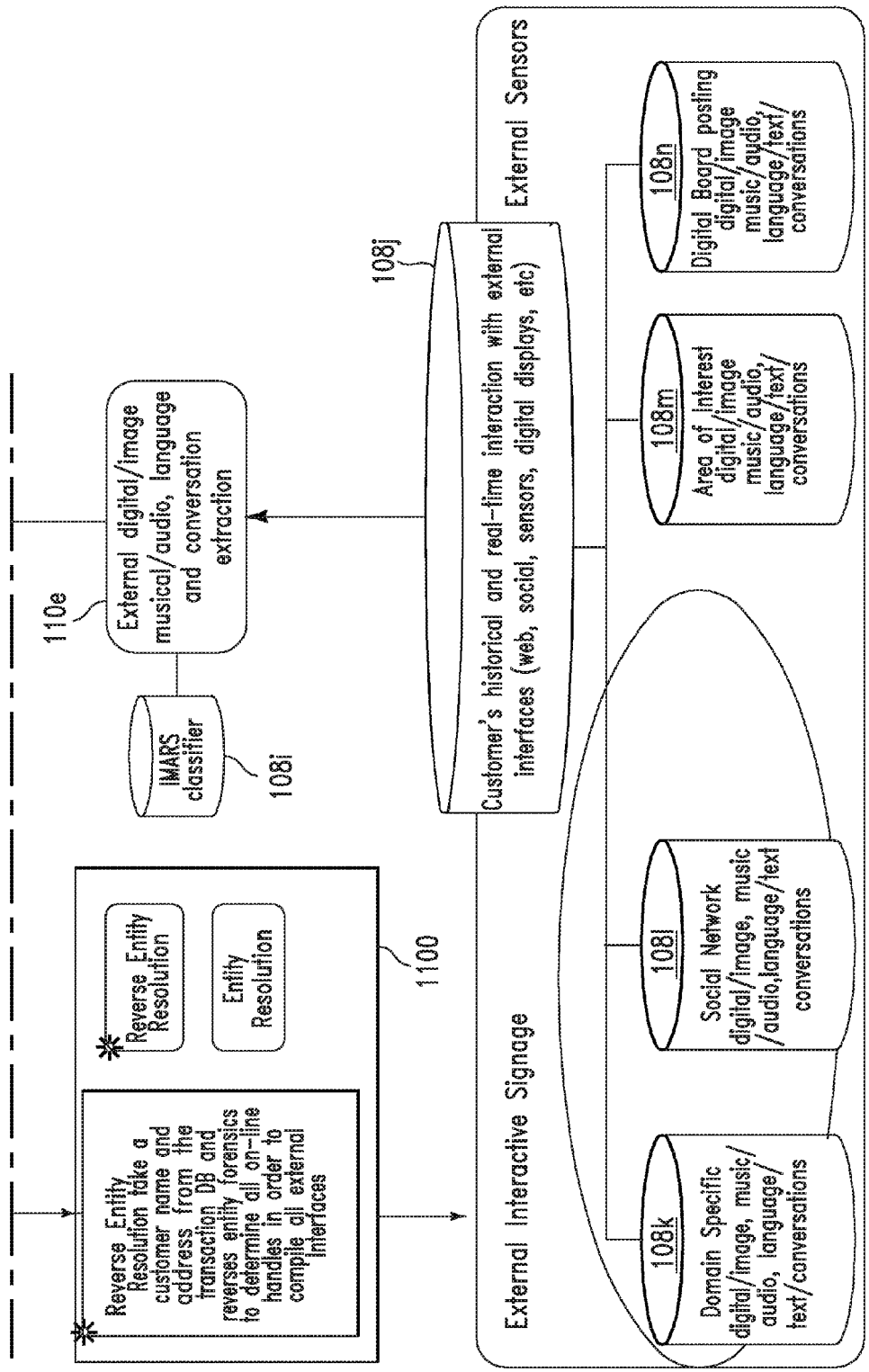

FIG. 1, including FIGS. 1A-1C, illustrates a system 100 for determining a consumer buying sentiment, in accordance with embodiments of the present invention. System 100 enables method that includes:

1. Uploading and analyzing a digital image, video, and/or audio content of a consumer.
2. Posting results of the analysis as text to a profile of the consumer based on a text analyses associated with prior interactions of the consumer.

3. Searching the profile for products or services to present to the consumer.

System 2 of FIG. 1 includes software modules 110a . . . 110i and databases 108a . . . 108n connected through a network 7. Network 7 may include any type of network including, inter alia, a local area network, (LAN), a wide area network (WAN), the Internet, a wireless network, etc. Software modules 110a . . . 110j in combination with databases 108a . . . 108n enable the following process for determining presentation settings for presenting products and services to the user:

Module 110a enables a login and/or presence detection process associated with a user (e.g., consumer, a register, a previous user, etc.) associated with an entity (e.g., a company). The user interacts with the entity via a Website, a mobile device, a kiosk, a tablet, a sensor, an interactive signage/display, an RFID tagged item/product, etc. For example, a user has logged into the entity's Website and has additionally previously purchased products from the Entity's Website. The user's views, selections, uploads, downloads, searches, gestures, and context are captured by system 100.

Module 110b retrieves data (from database 108a) associated with historical real time interactions with the user. Database 108a may include data retrieved during previous visits to the entity's Website, social network site and/or any additional entity sponsored social sites, etc. Additionally, database 108a may include user/entity associated inbound emails, live chat captures, call center captures, recommendation/review postings, tags, entity blogs, SKU images, video images, digital catalogs, store sensors, etc. For example, the user has viewed specific SKU images, content images, and video of his/her interest/preferences. Additionally, the user has posted reviews and recommendations on entity's web site and has posted his/her favorite images on entity's social network site. The data from database 108a may be analyzed using deep language analytics.

Module 110c (e.g., a multimedia analysis and retrieval system (IMARS) tool) allows all internal (i.e., to the entity) extractions (e.g., the user's activity/likes/preferences with regard to all digital imagery, music/audio, and copy/text) from database 108a to be mined IMARS classifiers and additional forms of linguistic analysis. IMARS comprises a system that is used to automatically index, classify, and search large collections of digital images and videos. IMARS applies computer-based algorithms that analyze visual features of the images and videos, and subsequently allows them to be automatically organized and searched based on their visual content (i.e., classifiers). Additionally, IMARS:

1. Automatically identifies, and optionally removes, exact duplicates from large collections of images and videos.
2. Automatically identifies near-duplicates.
3. Automatically clusters images into groups of similar images based on visual content.
4. Automatically classifies images and videos as belonging or not to a pre-defined set (i.e., taxonomy) of semantic categories.
5. Performs content-based retrieval to search for similar images based on one or more query images.
6. Tags images to create user defined categories within the collection.
7. Performs text based and metadata based searches.

Module 110c retrieves a collection of images and videos from the user, and produces indexes based on mathematical analyses of each piece of content. The indexes organize results of the analyses. IMARS extraction functionality is enabled by two main categories of computer algorithms that work together to bridge a semantic gap for images and videos:

A first category comprises visual feature extraction enabling a process to analyze pixel-level contents of each image and video, and create a multi-dimensional vector description of its visual features. Since there are many important dimensions of visual contents, such as color, texture, shape, and spatial layout, IMARS utilizes a large set of visual feature extraction algorithms that extract descriptors across a wide array of visual dimensions. A second category comprises visual semantic extraction enabling a process for applying machine learning techniques to extracted visual descriptors. IMARS is supported by a broad array of pre-trained semantic classifiers that automatically identify whether each new image and video belongs to one or more of the pre-defined semantic categories in the taxonomy based on its extracted visual descriptors. IMARS provides additional capabilities based on unsupervised classification that cluster the images and videos purely based on their extracted visual descriptors, without assigning them any label, and allow searching based on visual similarity.

As a result of the IMARS mining process, the entity may establish unique customer (user) preferences such as color, patterns, style, mood, juxtaposition, context, season, location, etc. resulting in establishing unique personality traits both inherent and non-inherent embedded in the user's preferences as defined, supra.

Module 110j converts the user's mined and newly created preferences and personality traits (i.e., generated by module 110c) into a set of attributes and caches the aforementioned preferences and traits within database 108h. Since the user's activities are dynamic and ever-changing, the attributes are dynamic and may be temporal. Therefore, attributes are stamped with a time, source of origination, etc. If newer, more recent user interactions indicate a change in preferences and/or personality traits, then attributes and personality traits are updated in real-time, near time, and/or batch time. All previous and historical attributes are archived in database 108h for further analysis/mining and to determine a model of change/cycle.

Module 110d enables an entity resolution process and a reverse entity resolution process with respect to the aforementioned data/identifiers from database 108a. For example, as a registered, previous user, and purchaser of entity's items/products/services, the user has given the entity his/her name, address, and email. The entity resolution process and a reverse entity resolution process determines and captures the user's social handles (e.g., from social networking Websites).

Module 110i enables a process for (via the use of a big data platform, scrapping technology, etc.) locating the user's use and activity via social network handles on various social network Websites, competitors sites, like-domain sites, blogs, special interest sites, external locations where sensors have allowed interacted with the customer (e.g., digital signage, kiosks, etc.), etc.

Module 110e (e.g., an IMARS tool) allows all external (i.e., to the entity) extractions (e.g., the user's activity/likes/preferences with regard to all digital imagery, music/audio, copy/text (viewed/read/posted by the user)) from database 108i and 108j to be mined IMARS classifiers and additional forms of linguistic analysis. As a result of the mining process, the entity has established unique customer preferences such as color, patterns, style, mood, juxtaposition, context, season, location, etc. As a result of the mining process, the entity has additionally established unique personality traits both inherent and non-inherent embedded in the user's preferences from the user's external activity.

Module 110*j* converts the user's externally mined and newly created preferences and personality traits (i.e., generated by module 110*e*) into a set of attributes and caches the aforementioned preferences and traits within database 108*h*. Since the user's activities are dynamic and ever-changing, the attributes are dynamic and may be temporal. Therefore, attributes are stamped with a time, source of origination, etc. If newer, more recent user interactions indicate a change in preferences and/or personality traits, then attributes and personality traits are updated in real-time, near time, and/or batch time. All previous and historical attributes are archived in database 108*h* for further analysis/mining and to determine a model of change/cycle.

Database 108*g* retrieves all internal and external unique user preferences and unique personality traits (e.g., as a set of attributes generated by modules 110*c* and 110*e*) and uses a dynamic, real-time, near-time and/or batch time to populate the database 108*g* (e.g., a customer database) and a user ID with session/activity attributes.

A rules and rendering engine module 110*f* links with the user ID and its newly assigned attributes and tags and extracts product data (e.g., SKU images, video/audio, etc.), content (e.g., images, video/audio, etc.), and language (text, copy, live chat scripts, email scripts, etc.) corresponding with newly mined and established user preferences and user personality traits.

Module 110*g* applies extracted assets/content (from databases 108*d*, 108*e*, and 108*f*) to the user's session/activity in the form of Webpage imagery, copy, text, content, results hierarchy, etc., resulting in highly personalized content.

Module 110*h* captures the user's session activity. Any newly viewed digital imagery, audio, or language is looped back into system 100 for additional mining and attributing.

Figure 2:
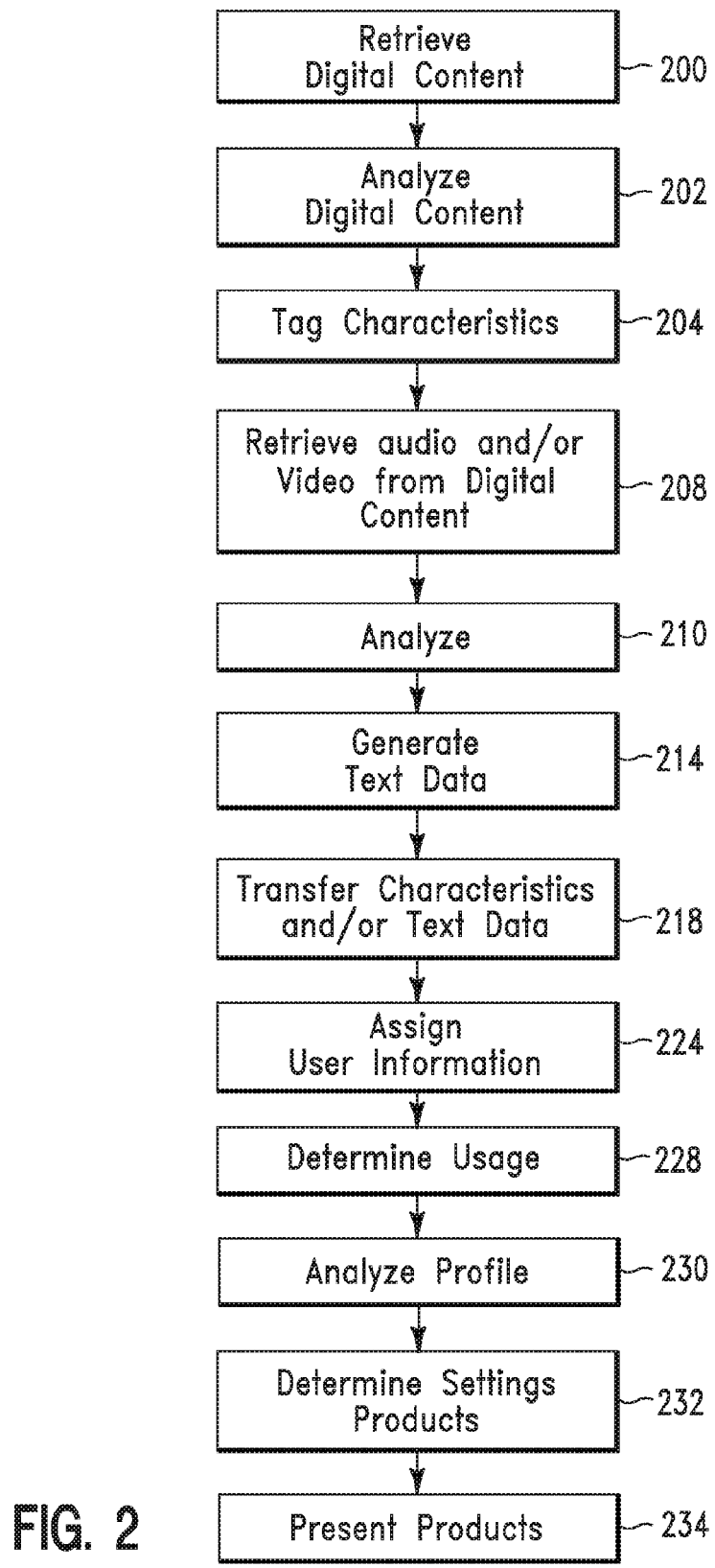
FIG. 2 illustrates an algorithm detailing a process flow enabled by the system of FIG. 1, in accordance with embodiments of the present invention.

FIG. 2 illustrates an algorithm detailing a process flow enabled by system 100 of FIG. 1 for determining a consumer buying sentiment, in accordance with embodiments of the present invention. Each of the steps in the algorithm of FIG. 2 may be enabled and executed by a computer processor executing computer code. In step 200, digital content associated with a user is retrieved (e.g., from a social network Website associated with the user). The digital content may include, inter alia, digital content generated by said user, digital content generated commercially and selected by the user, digital content generated by a social network and selected by the user, digital artifacts associated with the user, etc. In step 202, the digital content is analyzed (e.g., using an IMARS tool as described, supra). In step 204, characteristics describing digital content are tagged by on the analysis of step 202. The characteristics may include, inter alia, a form, a shape, a color, a tone, a hue, a dimension, a contrast, coordination, a setting, a light, a location, an object, etc. In optional step 208, audio (e.g., musical) and/or video (e.g., a digital image of the user at a specified location, a video stream, etc.) content is retrieved from the digital content of the user. In step 210, the audio and/or video content is analyzed (e.g., using an IMARS tool as described, supra). In step 214, text data describing the audio and/or video content is generated. The text data may include, inter alia, a social network like or dislike tag, a description, a review, a recommendation, etc. In step 218, the characteristics and the text data are transferred to a profile (as described, infra) of the user. The profile additionally includes additional characteristics generated during previous analysis of data from the digital content and additional digital content associated with the user. In step 224, user information associated with products, a location, and a time profile is assigned based on previous analysis. In step 228, it is determined that the user is currently visiting a consumer Website. In step 230 (based on selection and interaction of the user with respect to the consumer Website), the profile (comprising the text data, the characteristics, and the additional characteristics) is analyzed with respect to products and services of the consumer Website. In step 232, a presentation color setting and a group of products and services are determined (based on the analysis of step 230) for presentation to the user. In step 234, the group of products and services are presented to the user using the presentation color setting.

Figure 3:
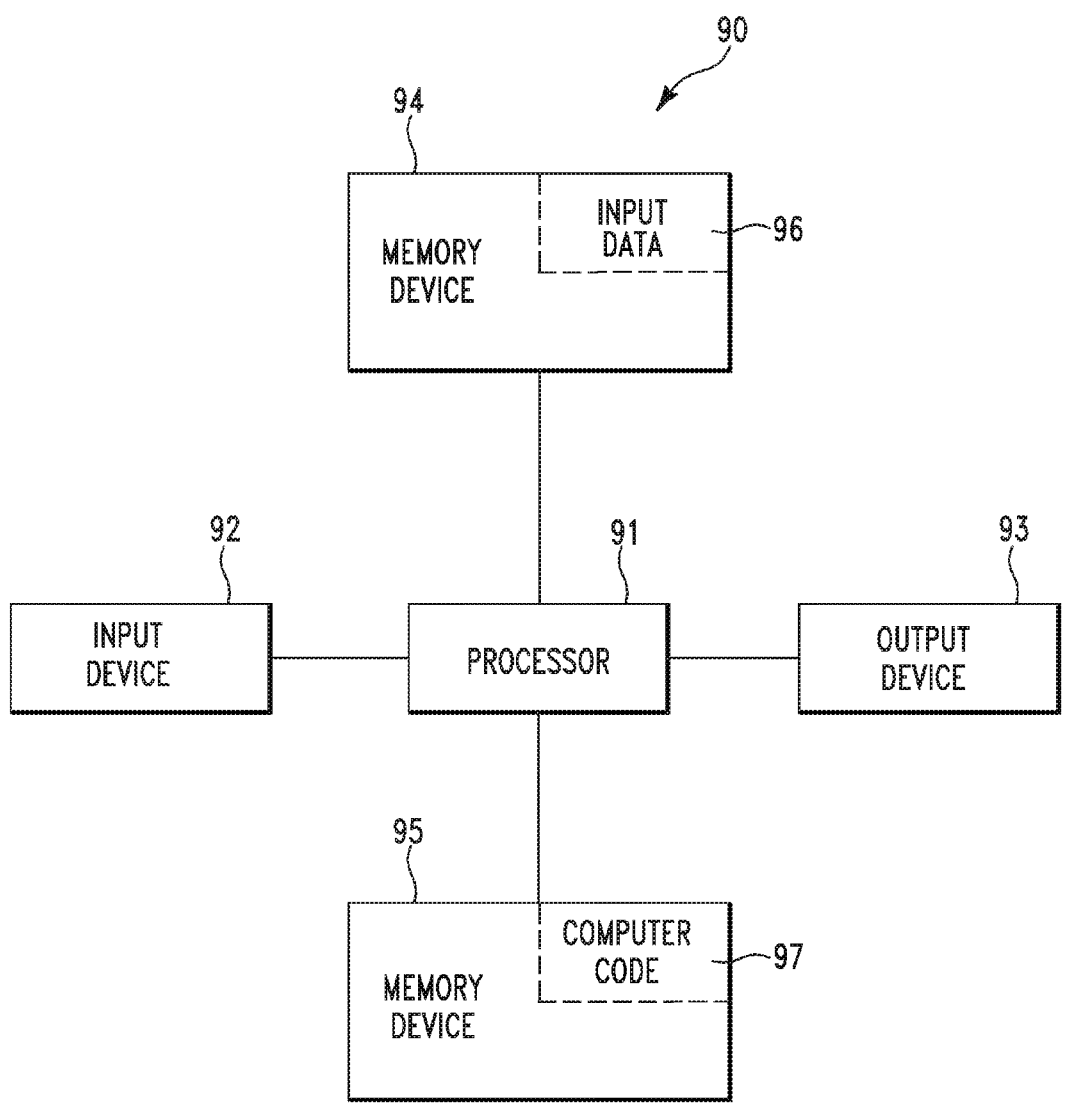
FIG. 3 illustrates a computer apparatus used by the system of FIG. 1 for determining a consumer buying sentiment, in accordance with embodiments of the present invention.

FIG. 3 illustrates a computer apparatus 90 used by system 100 of FIG. 1 for determining a consumer buying sentiment, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for determining a consumer buying sentiment. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to determine a consumer buying sentiment. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for determining a consumer buying sentiment. In another embodiment, the invention provides a business method that performs the process steps of the invention on a subscription, advertising, and/or fee basis. That is, a service supplier, such as a Solution Integrator, could offer to determine a consumer buying sentiment. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   first analyzing, by a computer processor of a computing system, digital content associated with a user, wherein said first analyzing comprises:
      analyzing a pixel level for each image and each video of said digital content;
      generating a multilevel description of visual features for each said image and each said video, wherein said visual features comprise colors, textures, shapes, and spatial layouts for each said image and each said video;
      identifying pre-defined semantic categories for each said image and each said video;
      determining mood preferences for said user; and
      determining personality traits of said user;
   automatically identifying, by said computer processor, duplicate visual image data within said digital content;
   automatically removing, by said computer processor, said duplicate visual image data from said digital content;
   tagging, by said computer processor based on results of said first analyzing, characteristics describing said digital content;
   transferring, by said computer processor, said characteristics to a profile of said user, said profile comprising additional characteristics generated during a previous text analysis of data from said digital content and additional digital content associated with said user, wherein said additional digital content is associated with prior interactions between said user and a company via a sensor based retrieval process associated with retrieving said additional digital content via sensors at a location of said company;
   assigning, by said computer processor based on said previous text analysis, user information associated with products, a location, and a time profile;
   determining, by said computer processor, that said user is currently visiting a consumer Website of said company;
   retrieving, by said computer processor from said digital content of said user, posted reviews and recommendations from said user posted on a social network portion of said consumer Website;
   generating, by said computer processor based on results of analyzing said posted reviews and recommendations, review based text data describing said posted reviews and recommendations;
   transferring, by said computer processor, said review based text data to said profile of said user;
   second analyzing, by said computer processor based on results of said automatically identifying and a selection and interaction of said user with respect to said consumer Website, said profile comprising said characteristics, said review based text data, and said additional characteristics with respect to products and services of said consumer Website;
   determining, by said computer processor based on results of said second analyzing, a presentation color setting and a group of products and services of said products and services for presentation to said user; and
   presenting, by said computer processor to said user using said presentation color setting, said group of products and services.

2. The method of claim 1, further comprising:
   retrieving, by said computer processor from said digital content of said user, audio content associated with said user;
   third analyzing, by said computer processor, said audio content;
   generating, by said computer processor based on results of said third analyzing, text data describing said audio content;
   transferring, by said computer processor, said text data to said profile of said user, wherein said second analyzing further comprises analyzing said profile comprising said characteristics, said text data, and said additional characteristics with respect to said products and services.

3. The method of claim 2, wherein said audio content comprises musical content belonging to said user.

4. The method of claim 2, wherein said text data comprises data associated with a social network like or dislike tag, a description, a review, or a recommendation.

5. The method of claim 1, further comprising:
   retrieving, by said computer processor from said digital content of said user, video content associated with said user;
   third analyzing, by said computer processor, said video content;
   generating, by said computer processor based on results of said third analyzing, text data describing said video content;
   transferring, by said computer processor, said text data to said profile of said user, wherein said second analyzing further comprises analyzing said profile comprising said characteristics, said text data, and said additional characteristics with respect to said products and services.

6. The method of claim 5, wherein said video content comprises a digital image associated with said user.

7. The method of claim 6, wherein said digital image comprises an image of said user at a specified location.

8. The method of claim 6, wherein said digital image comprises an image a specified location.

9. The method of claim 5, wherein said video content comprises a video stream associated with said user.

10. The method of claim 1, wherein said digital content is retrieved from at least one social network of said user.

11. The method of claim 1, wherein said digital content is retrieved from at least one media sharing space of said user.

12. The method of claim 1, wherein said group of products and services is presented to said user via a digital advertisement.

13. The method of claim 12, wherein said specified location comprises a retail location.

14. The method of claim 1, wherein said digital content comprises content selected from the group consisting of digital content generated by said user, digital content generated commercially and selected by said user, digital content generated by a social network and selected by said user, and digital artifacts associated with said user.

15. The method of claim 1, wherein said characteristics comprise digital image characteristics selected from the group consisting of a form, a shape, a color, a tone, a hue, a dimension, a contrast, a coordination, a setting, a light, a location, and an object of said digital image.

16. The method of claim 1, further comprising providing at least one support service for at least one of creating, integrating, hosting, maintaining, and deploying computer-readable program code in a computing system, wherein the program code in combination with said computing system is configured to implement the method of claim 1.

17. A computer program product, comprising a non-transitory computer readable hardware storage device storing a computer readable program code, said computer readable program code comprising an algorithm that when executed by a computer processor of a computer system implements a method, said method comprising:
  first analyzing, by said computer processor of a computing system, digital content associated with a user, wherein said first analyzing comprises:
    analyzing a pixel level for each image and each video of said digital content;
    generating a multilevel description of visual features for each said image and each said video, wherein said visual features comprise colors, textures, shapes, and spatial layouts for each said image and each said video;
    identifying pre-defined semantic categories for each said image and each said video;
    determining mood preferences for said user; and
    determining personality traits of said user;
  automatically identifying, by said computer processor, duplicate visual image data within said digital content;
  automatically removing, by said computer processor, said duplicate visual image data from said digital content;
  tagging, by said computer processor based on results of said first analyzing, characteristics describing said digital content;
  transferring, by said computer processor, said characteristics to a profile of said user, said profile comprising additional characteristics generated during a previous text analysis of data from said digital content and additional digital content associated with said user, wherein said additional digital content is associated with prior interactions between said user and a company via a sensor based retrieval process associated with retrieving said additional digital content via sensors at a location of said company;
  assigning, by said computer processor based on said previous text analysis, user information associated with products, a location, and a time profile;
  determining, by said computer processor, that said user is currently visiting a consumer Website of said company;
  retrieving, by said computer processor from said digital content of said user, posted reviews and recommendations from said user posted on a social network portion of said consumer Website;
  generating, by said computer processor based on results of analyzing said posted reviews and recommendations, review based text data describing said posted reviews and recommendations;
  transferring, by said computer processor, said review based text data to said profile of said user;
  second analyzing, by said computer processor based on results of said automatically identifying and a selection and interaction of said user with respect to said consumer Website, said profile comprising said characteristics, said review based text data, and said additional characteristics with respect to products and services of said consumer Website;
  determining, by said computer processor based on results of said second analyzing, a presentation color setting and a group of products and services of said products and services for presentation to said user; and
  presenting, by said computer processor to said user using said presentation color setting, said group of products and services.

18. The computer program product of claim 17, wherein said method further comprises:
  retrieving, by said computer processor from said digital content of said user, audio content associated with said user;
  third analyzing, by said computer processor, said audio content;
  generating, by said computer processor based on results of said third analyzing, second text data describing said audio content;
  transferring, by said computer processor, said second text data to said profile of said user, wherein said second analyzing further comprises analyzing said profile comprising said first text data, said second text data, and said additional text data with respect to said products and services.

19. The computer program product of claim 17, wherein said audio content comprises musical content belonging to said user.

20. A computer system comprising a computer processor coupled to a computer-readable memory unit, said memory unit comprising instructions that when executed by the computer processor implements a method comprising:
  first analyzing, by said computer processor of a computing system, digital content associated with a user, wherein said first analyzing comprises:
    analyzing a pixel level for each image and each video of said digital content;
    generating a multilevel description of visual features for each said image and each said video, wherein said visual features comprise colors, textures, shapes, and spatial layouts for each said image and each said video;
    identifying pre-defined semantic categories for each said image and each said video;
    determining mood preferences for said user; and
    determining personality traits of said user;
  automatically identifying, by said computer processor, duplicate visual image data within said digital content;
  automatically removing, by said computer processor, said duplicate visual image data from said digital content;
  tagging, by said computer processor based on results of said first analyzing, characteristics describing said digital content;
  transferring, by said computer processor, said characteristics to a profile of said user, said profile comprising additional characteristics generated during a previous text analysis of data from said digital content and additional digital content associated with said user, wherein said additional digital content is associated with prior interactions between said user and a company via a sensor based retrieval process associated with retrieving said additional digital content via sensors at a location of said company;

assigning, by said computer processor based on said previous text analysis, user information associated with products, a location, and a time profile;

determining, by said computer processor, that said user is currently visiting a consumer Website of said company;

retrieving, by said computer processor from said digital content of said user, posted reviews and recommendations from said user posted on a social network portion of said consumer Website;

generating, by said computer processor based on results of analyzing said posted reviews and recommendations, review based text data describing said posted reviews and recommendations;

transferring, by said computer processor, said review based text data to said profile of said user;

second analyzing, by said computer processor based on results of said automatically identifying and a selection and interaction of said user with respect to said consumer Website, said profile comprising said characteristics, said review based text data, and said additional characteristics with respect to products and services of said consumer Website;

determining, by said computer processor based on results of said second analyzing, a presentation color setting and a group of products and services of said products and services for presentation to said user; and presenting, by said computer processor to said user using said presentation color setting, said group of products and services.

* * * * *